(12) United States Patent
Huang et al.

(10) Patent No.: US 8,723,838 B2
(45) Date of Patent: May 13, 2014

(54) SENSOR APPARATUS WITH DIFFERENT PROXIMITY SENSORS AND SENSING METHOD THEREOF

(75) Inventors: Cheng-Chieh Huang, Taipei (TW); Jinn-Ann Kuo, Taipei (TW); Chi-Huang Chang, Taoyuan County (TW); Yu-Hao Kao, New Taipei (TW)

(73) Assignee: Capella Microsystems (Taiwan), Inc., New Taipei (TW)

( * ) Notice: Subject to any disclaimer, the term of this patent is extended or adjusted under 35 U.S.C. 154(b) by 205 days.

(21) Appl. No.: 13/329,869

(22) Filed: Dec. 19, 2011

(65) Prior Publication Data
US 2012/0212453 A1 Aug. 23, 2012

Related U.S. Application Data

(60) Provisional application No. 61/445,547, filed on Feb. 23, 2011.

(51) Int. Cl.
*G06F 3/042* (2006.01)

(52) U.S. Cl.
USPC ........... 345/175; 250/221; 345/207; 345/158; 345/169; 345/173; 178/18.09; 178/19.05; 455/566

(58) Field of Classification Search
USPC ................. 345/156, 157, 173, 175, 169, 207; 250/221; 455/566; 178/18.09, 19.05
See application file for complete search history.

(56) References Cited

U.S. PATENT DOCUMENTS

| | | | | |
|---|---|---|---|---|
| 7,855,718 B2* | 12/2010 | Westerman | ................... | 345/173 |
| 2010/0255886 A1* | 10/2010 | Shouji | ............................. | 455/566 |
| 2011/0234491 A1* | 9/2011 | Nurmi | ............................. | 345/157 |
| 2011/0248151 A1* | 10/2011 | Holcombe et al. | ............ | 250/221 |
| 2011/0248152 A1* | 10/2011 | Svajda et al. | .................. | 250/221 |

* cited by examiner

*Primary Examiner* — Lun-Yi Lao
*Assistant Examiner* — Johny Lau
(74) *Attorney, Agent, or Firm* — Muncy, Geissler, Olds & Lowe, P.C.

(57) ABSTRACT

The present invention discloses a proximity sensing apparatus and a method thereof. A sensor apparatus comprises a panel, an emitting device, and a proximity sensor module. The panel includes a first transparent area and a second transparent area; an emitting device is located under the panel and the emitting device emitting a light passing through the first transparent area. The proximity sensor module is located under the panel and the proximity sensor module includes at least one proximity sensor with high sensitivity which is a second proximity sensor and at least one proximity sensor with low sensitivity which is a first proximity sensor, and the proximity sensor module receives the light passing through the second transparent area. The light passing through the first transparent area and then reflecting from an object to passing through the second transparent area, and the panel is able to provide a touch function.

19 Claims, 10 Drawing Sheets

SENSOR APPARATUS WITH DIFFERENT PROXIMITY SENSORS AND SENSING METHOD THEREOF

CROSS-REFERENCE TO RELATED APPLICATION

This application claims the benefit of U.S. Provisional Application No. 61/445,547, filed on Feb. 23, 2011, in the US. Patent and Trademark Office the disclosure of which is incorporated herein by reference.

FIELD OF THE INVENTION

The present invention is related to a sensor apparatus with different proximity sensors and method thereof, and particularly to a sensor apparatus that is able to temperately stop the function of touch panel of the handheld device under certain circumstance.

BACKGROUND OF THE INVENTION

Currently, many handheld devices, such as Smartphone and PDA, have been popular for years. Especially Smartphone, not only provides an operation system with various programs, which is used for recording information, playing music, providing ebook, browsing Webpage, but also attains communication purpose. However, there are several drawbacks needed to be overcome while the user using the Smartphone.

For example, since Smartphone belongs to one type of phones, when the user does not use the earphone or the handsfree function, it will be inevitable to hold the Smartphone attaching on the face. Please refer to FIG. 1, which is a schematic view illustrating a structure of a conventional handheld device 1'.

The handheld device 1' comprises a screen 10', a plurality of visual buttons 11', a speaker 12', and a microphone 13'. The visual buttons 11' are located on the screen 10' which includes a panel provide touch function. By using those visual buttons 11' of the handheld device 1', the users can enjoy the multiple functions of the handheld device 1' without pressing the actual buttons which are disposed on the screen not only requiring space but hard to be operated.

However, when the user is using the handheld device 1', editing words or playing games for examples, and a phone call is coming at the same time, the user may immediately stop to answer the phone call. In such circumstance, the users need to use the face attaching the handheld device 1', just as shown in FIG. 2. It is highly possible that the user's face will inadvertently press the visual buttons 11' and the work the user previously coped with before the phone call will be influenced.

The main reason resulting in the consequence mentioned above is the limit of the conventional sensor apparatus. Please refer to the FIG. 3, which is a side view illustrating a conventional sensor apparatus. The conventional sensor apparatus comprises a panel 2', an emitting device 4', and a proximity sensor module 5'. The panel 2' includes a first transparent area 21' and a second transparent area 22'. The proximity sensor module 5' includes a proximity sensor 51', which is a kind of low sensitivity proximity sensor. The emitting device 4' emits light, passing through the first transparent area 21' to the object, and the light reflects from the object, passing through the second transparent area 22' to the proximity sensor module 5' (the arrow line shown in the FIG. 3 is used for illustrating the light path). By means of detecting the light reflecting from the object (not shown), the proximity sensor 51' is able to detect the distance to the object (here means the distance between object and the proximity sensor 51') and transmit the information to a process module 6'. Nonetheless, the maximum distance the proximity sensor 51' can measure the object is L1; the minimum distance the proximity sensor 51' can measure the object is zero distance L0. The zero distance L0 is the distance between the object and the proximity sensor 51' that is substantially close to zero. Although the proximity sensor 51' is low sensitivity, it cannot detect the distance to the object when the object passes through the zero distance L0. Therefore, even if the user's face has already pressed on the screen 10', the process module 6' may determine the object is far away from the screen 10' and keep the touch function of the panel available. Thus, the event of pressing the visual buttons 11 happens.

In order to solve this problem, it is necessary to contemplate a mechanism that is able to turn off the touch function of the panel when the large area of screen 10 is close to/attach to the object. One of the innovative functions the present invention can provide is to solve that problem.

SUMMARY OF THE INVENTION

The present invention is related to a sensor apparatus with different proximity sensors and method thereof. A sensor apparatus comprises a panel, an emitting device, and a proximity sensor module. The panel includes a first transparent area and a second transparent area; an emitting device is located under the panel and the emitting device emitting a light passing through the first transparent area. The proximity sensor module is located under the panel and the proximity sensor module includes at least one proximity sensor with high sensitivity which is a second proximity sensor and at least one proximity sensor with low sensitivity which is a first proximity sensor, and the proximity sensor module receives the light passing through the second transparent area. The light passing through the first transparent area and then reflecting from an object to passing through the second transparent area, and the panel is able to provide a touch function. A method of the sensor apparatus with at least two proximity sensors with different sensitivities comprises the following steps: providing a panel including a first transparent area and a second transparent area; providing an emitting device located under the panel and the emitting device emitting a light passing through the first transparent area; providing a proximity sensor module located under the panel and the proximity sensor module including at least one proximity sensor with high sensitivity which is a second proximity sensor and at least one proximity sensor with low sensitivity which is a first proximity sensor, and the proximity sensor module receiving the light passing through the second transparent area; and wherein the light passing through the first transparent area and then reflecting from a object to passing through the second transparent area, and the panel is able to provide a touch function. The present invention uses different sensors with different sensitivities to detect the object and further determine whether the touch function should be turned on or off.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of sensor apparatus with different proximity sensors and method thereof.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

Figure 1:
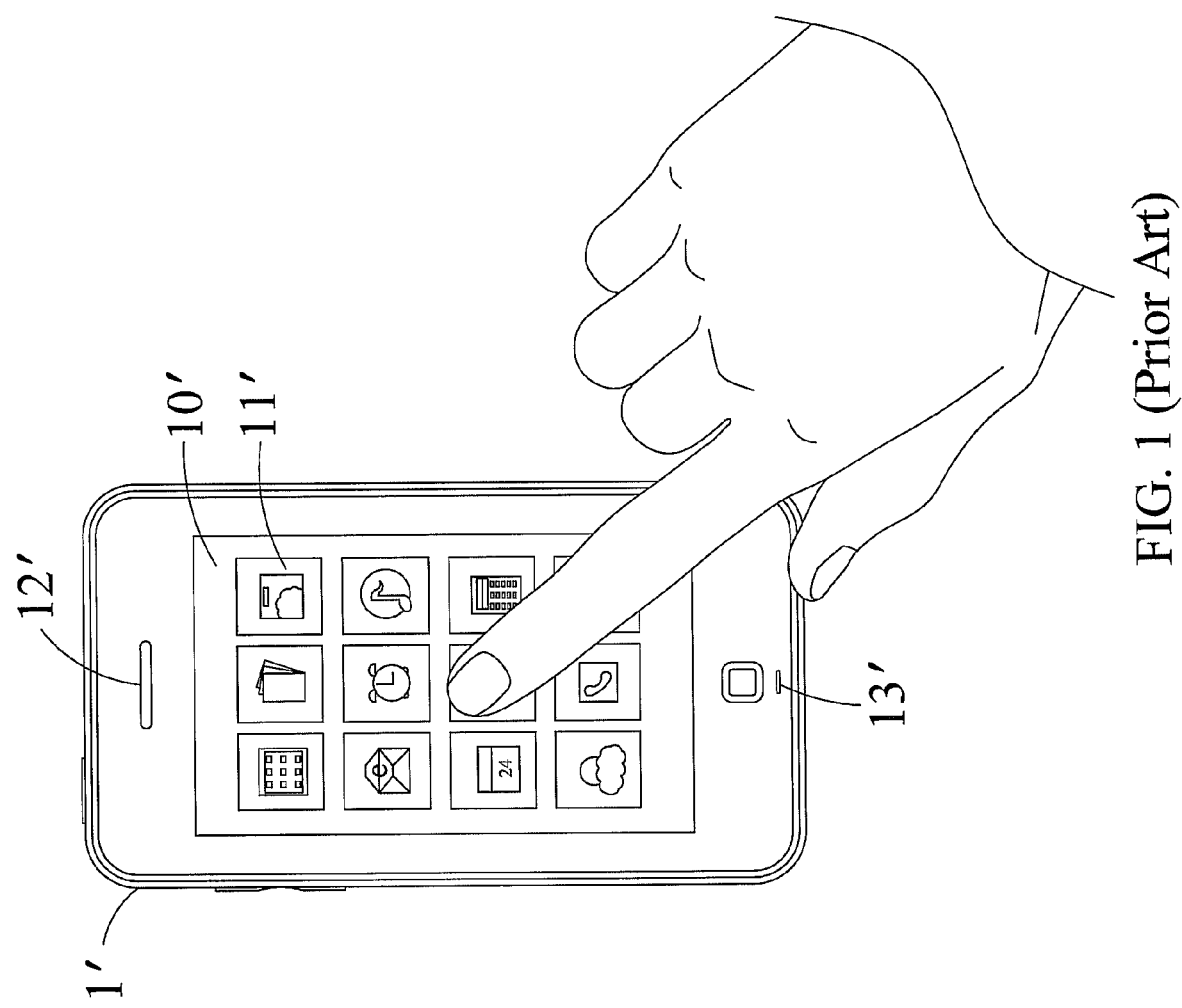
FIG. 1 is a schematic view illustrating a structure of a conventional handheld device.
Figure 2:
FIG. 2 is a schematic view illustrating a conventional handheld device attaching zero distance.
Figure 3:
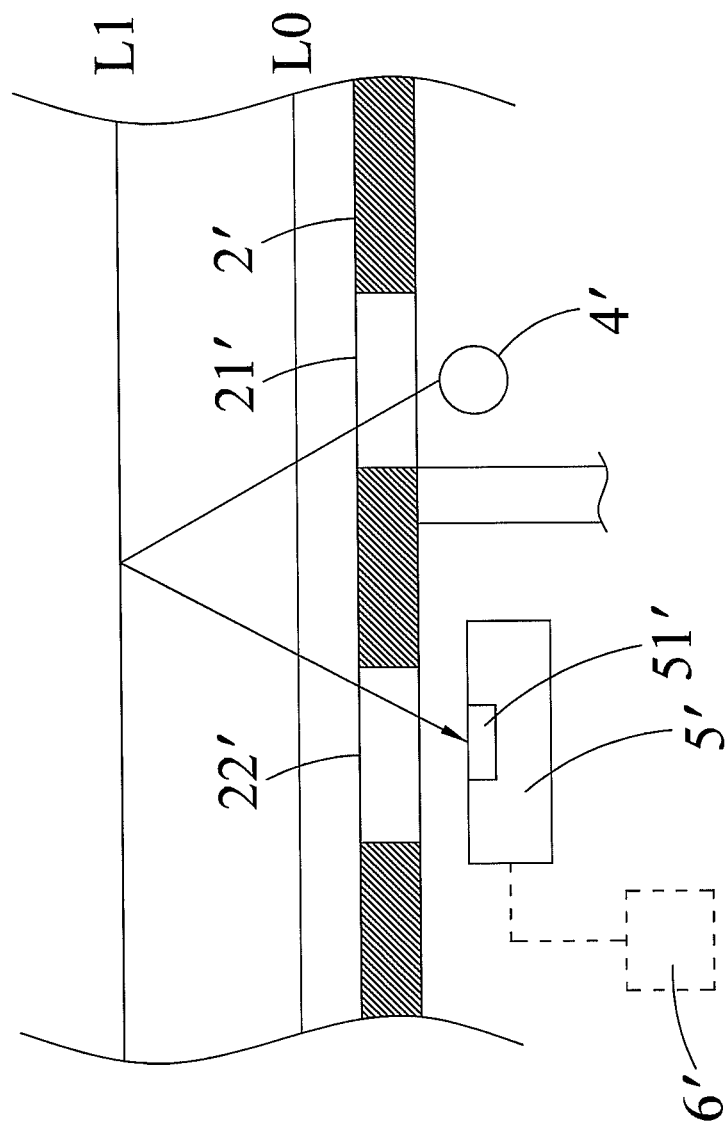
FIG. 3 is a perspective side view illustrating a conventional sensor apparatus.
Figure 4:
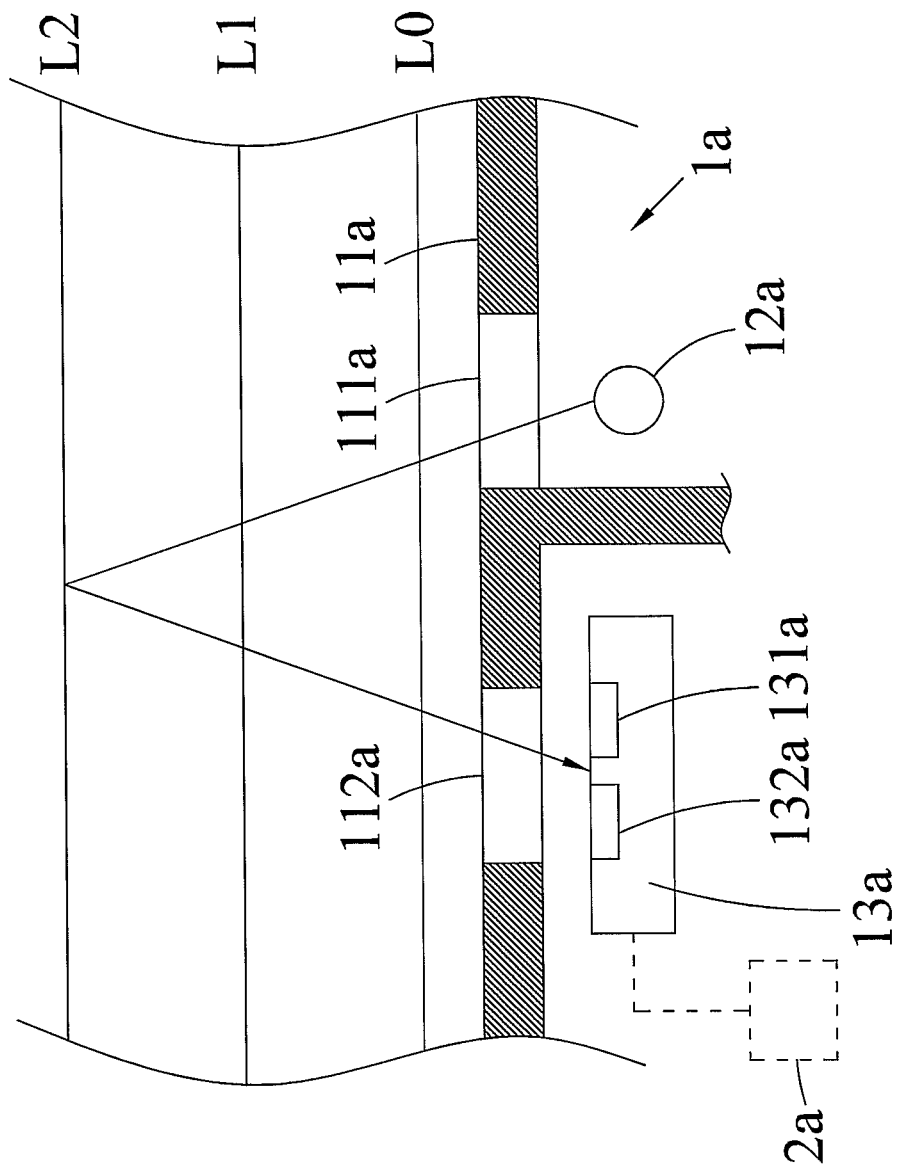
FIG. 4 is a perspective side view illustrating two different proximity sensors of the sensor apparatus of the first embodiment according to the present invention.

The present invention shows a sensor apparatus with different proximity sensors. In the first embodiment, the number of the proximity sensors in the sensor apparatus is two. Nevertheless, the number of the proximity sensors depends on practical usage. FIG. 4 is a perspective side view illustrating two different proximity sensors of the sensor apparatus of the first embodiment according to the present invention. A sensor apparatus 1a comprises a panel 11a, an emitting device 12a, and a proximity sensor module 13a. The panel 11a includes a first transparent area 111a and a second transparent area 112a. The panel 11a includes a plurality of sensors (not shown) which help to provide touch function.

The proximity sensor module 13a includes a first proximity sensor 131a and a second proximity sensor 132a. The first proximity sensor 131a is a kind of low sensitivity proximity sensor. The second proximity sensor 132a is a kind of high sensitivity proximity sensor. As mentioned in the background of the present invention, it is hard for the first proximity sensor 131a which is a proximity sensor with low sensitivity to detect the zero distance L0. The zero distance L0 is the distance between an object and the first proximity sensor 131a that is substantially zero (or attach). In FIG. 4, the maximum distance the first proximity sensor 131a can measure the object is L1; the minimum distance the first proximity sensor 111a can measure the object is zero distance L0. The maximum distance the second proximity sensor 132a can measure the object is L2. Because of the high sensitivity of the second proximity sensor 132a, distance of L2 is longer than that of L1; the second proximity sensor 132a is still able to detect the object even though the object passes through the zero distance L0. Actually, the sensitivities of the first proximity sensor 131a and the second proximity sensor 132a can be explained by how much light the first proximity sensor 131a and the second proximity sensor 132a can react. In other words, it is possible that the first proximity sensor 131a and the second proximity sensor 132a can receive the light but they can not detect the object until the light is up to the requirements of the first proximity sensor 131a and the second proximity sensor 132a to react. In the first embodiment, the requirement (the quantity of the light, luminous flux) of the first proximity sensor 131a is higher than that of the second proximity sensor 132a to react because of the difference in sensitivities. The second transparent area 112a is disposed above the proximity sensor module 13a and it is large enough for the light reflected from the object to pass through and thus reach the first proximity sensor 131a and the second proximity sensor 132a.

The emitting device 12a emits light, passing through the first transparent area 111a to the object (not shown), and the light reflects from the object passing through the second transparent area 112a to the proximity sensor module 13a. By means of detecting the light reflecting from the object, the first proximity sensor 131a and the second proximity sensor 132a are able to detect the distance to the objects and transmit the information to a process module 2a. The process module 2a is electrically connected with the proximity sensor module 13a.

Figure 5:
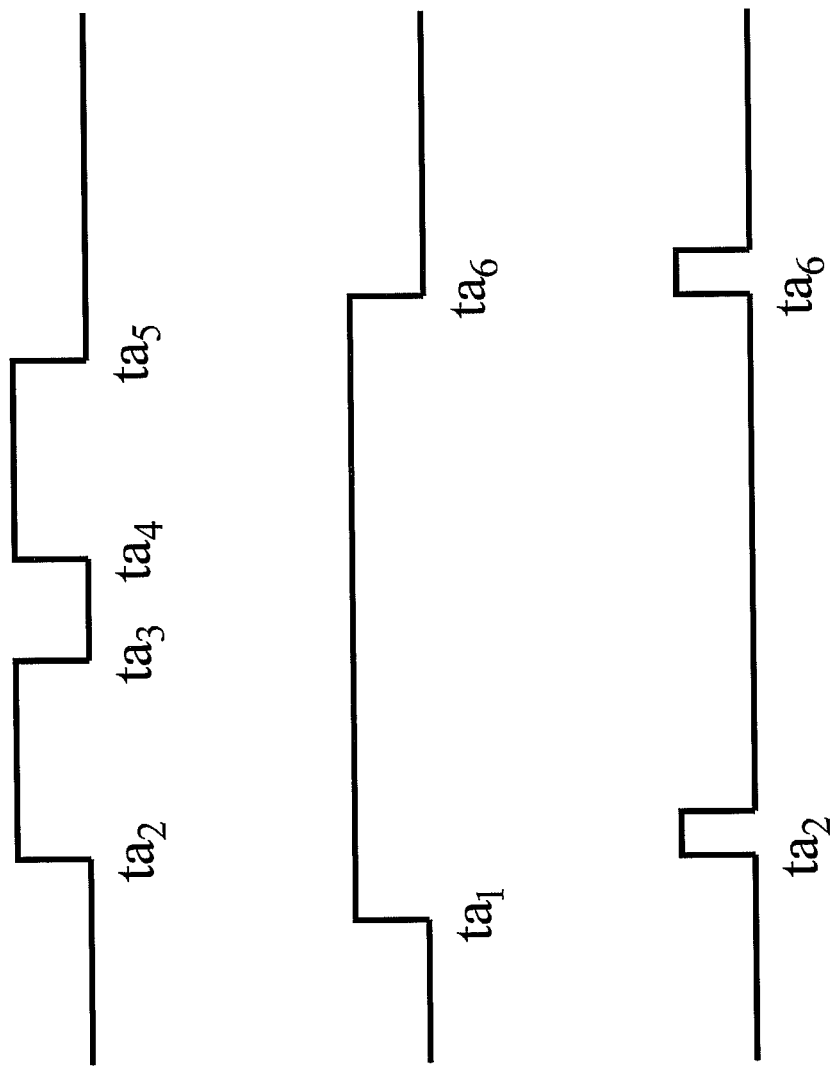
FIG. 5 is a timing diagram of two proximity sensors of the first embodiment according to the present invention.

The process module 2a is able to determine whether the touch function of the panel 11a should be turned off. Please refer to FIG. 5, which is a timing diagram of two proximity sensors of the first embodiment according to the present invention. The upper wave represents the process module 2a receiving the information from the first proximity sensor 131a. The middle wave represents the process module 2a receiving the information from the second proximity sensor 132a. The bottom wave represent process module 2a creating interruptions corresponding to the sensing information of the first proximity sensor 131a and the second proximity sensor 132a. In the upper and middle waves of the FIG. 5, the wave crests (high voltage) mean that the first proximity sensor 131a or the second proximity sensor 132a can detect the object; the wave troughs (low voltage) mean that the first proximity sensor 131a or the second proximity sensor 132a cannot detected the object. It can be explained that the wave crests of the upper wave and middle wave result from the light strength enough for the requirement of the first proximity sensor 131a or the second proximity sensor 132a to react. When the upper wave is at wave trough changing to at wave crest, it passes through the threshold of the first proximity sensor 131a. When the middle wave is at wave trough changing to at wave crest, it passes through the threshold of the second proximity sensor 132a. In the bottom wave of the FIG. 5, the wave crests mean the interruptions; the wave troughs mean no interruption in that time. The points $ta_1$, $ta_2$, $ta_3$, $ta_4$, $ta_5$, and $ta_6$ merely represent the order. The FIG. 5 describes the circumstance and reaction that the object from far to zero distance, and then from zero distance to far distance to the present invention.

Point $ta_1$: the object passes through the L2 (the maximum distance the second proximity sensor 132*a* can measure). Because of the high sensitivity of the second proximity sensor 132*a*, the middle wave is at wave crest.

Point $ta_2$: the object passes through the L1 (the maximum distance the first proximity sensor 131*a* can measure). The first proximity sensor 131*a* detects the object. The upper wave is at wave crest. When the moment upper wave just reaches wave crest and middle wave is still at wave crest, the process module 2*a* creates a first interruption, presetting when the first proximity sensor 131*a* cannot detect distance to the object but the second proximity sensor 132*a* can, the process module 2*a* adopts the distance information detected by the second proximity sensor 132*a*. The moment the first proximity sensor 131*a* detects the object may determine the creation of the first interruption, but in actual use, it is not limited in the method of settling the first interruption. The touch function is turned off. In addition, the point $ta_2$ is not necessarily happened after the point $ta_1$, it may be happened before the point $ta_1$ in actual use.

Point $ta_3$: the object passes through zero distance L0 (the minimum distance the first proximity sensor 131*a* can measure, and it could be close to or attach to the present invention). The first proximity sensor 131*a* cannot detect the object and therefore the upper wave of FIG. 5 changes from wave crest to wave trough. On the contrary, the second proximity sensor 132*a* is still at wave crest. The process module 2*a* adopts the distance information detected by the second proximity sensor 132*a*.

Point $ta_4$: the object passes through zero distance L0 (the object is leaving the present invention). The first proximity sensor 131*a* can detect the object and therefore the upper wave and the middle wave are both at wave crest again.

Point $ta_5$: the object passes through the L1 (leaving the present invention). The first proximity sensor 131*a* cannot detect the object. The upper wave is at wave trough and the middle wave is at wave crest.

Point $ta_6$: the object passes through the L2. The middle wave is at wave trough. The second proximity sensor 132*a* cannot detect the object. The turn off duration is between the point $ta_2$ and the point $ta_6$ in this embodiment, and the touch function is turned on after the point $ta_6$. The process module 2*a* creates a second interruption. The second interruption is created after the first interruption and the moment that the middle wave is at wave crest changing to at wave trough. The moment neither the first proximity sensor 131*a* nor the second proximity sensor 132*a* can detect the distance to the object may determine the creation of the second interruption, but in actual use, it is not limited in the method of settling the interruption.

The present invention uses different sensors with different sensitivities to detect the object and further determine whether the touch function should be turned on or off. The proximity sensor with high sensitivity can assist the proximity sensor with low sensitivity, especially when the object passes through the zero distance, where the proximity sensor with low sensitivity cannot detect the object. If the proximity sensor module only arranges a proximity sensor with high sensitivity, it may not be practical for the process module to determine a correct time to stop the touch function. Take the first embodiment as example. The second proximity sensor 132*a* may detect the object which is located around 40 cm (a common distance between face and handheld device when user uses the handheld device) above the present invention. The second proximity sensor 132*a* transmits the information to the process module 2*a*. It may cause the process module 2*a* to turn off the touch function because of its high sensitivity. However, in the present invention, the process module 2*a* uses the different crest wave time and trough wave time to make the panel turn off at an appropriate time. If the object is coming, after the moment that the first proximity sensor 131*a* is at crest wave (the process module 2*a* get the information that the first proximity sensor 131*a* pass its threshold value, in this circumstance the first interruption has been created), the process module 2*a* can prepare for turning off the touch function (interruption may be one kind of methods helping preparation, but the method is not limited). When the object leaving from zero distance, the first proximity sensor 131*a* can detect the distance to the object. The moment the first proximity sensor 131*a* and the second proximity sensor 132*a* neither detect the object, the process module 2*a* gets the information that the first proximity sensor 131*a* passes its threshold value and the second proximity 132*a* passes its threshold value; in this circumstance the second interruption has been created and the touch function is turned on. Also, in actual use, it is not limited in the method of settling the interruption.

Figure 6:
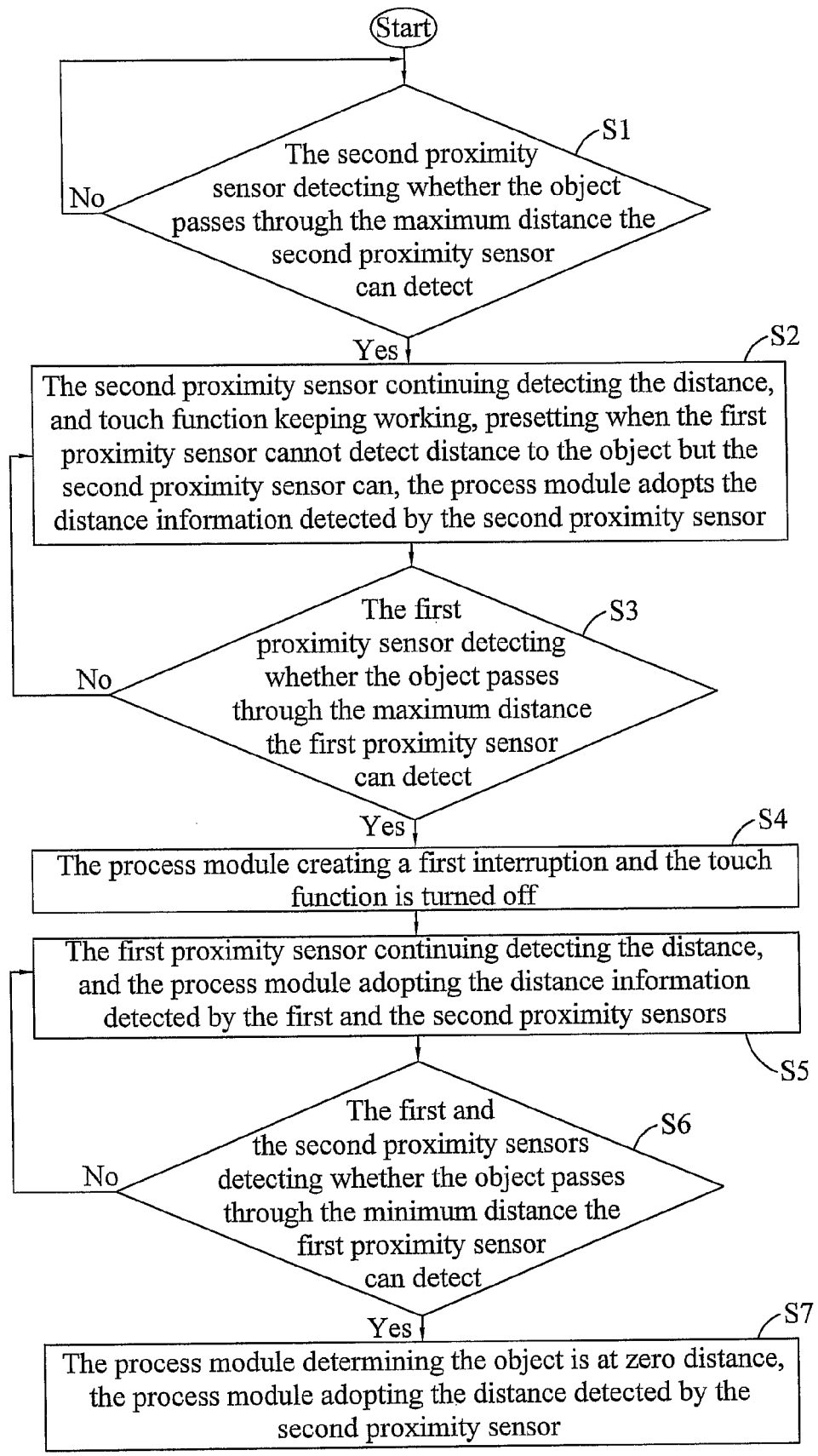
FIG. 6 is a partial flowchart illustrating sensing method of sensor apparatus with different proximity sensors detecting object from far distance to zero distance to the first embodiment according to the present invention.
Figure 7:
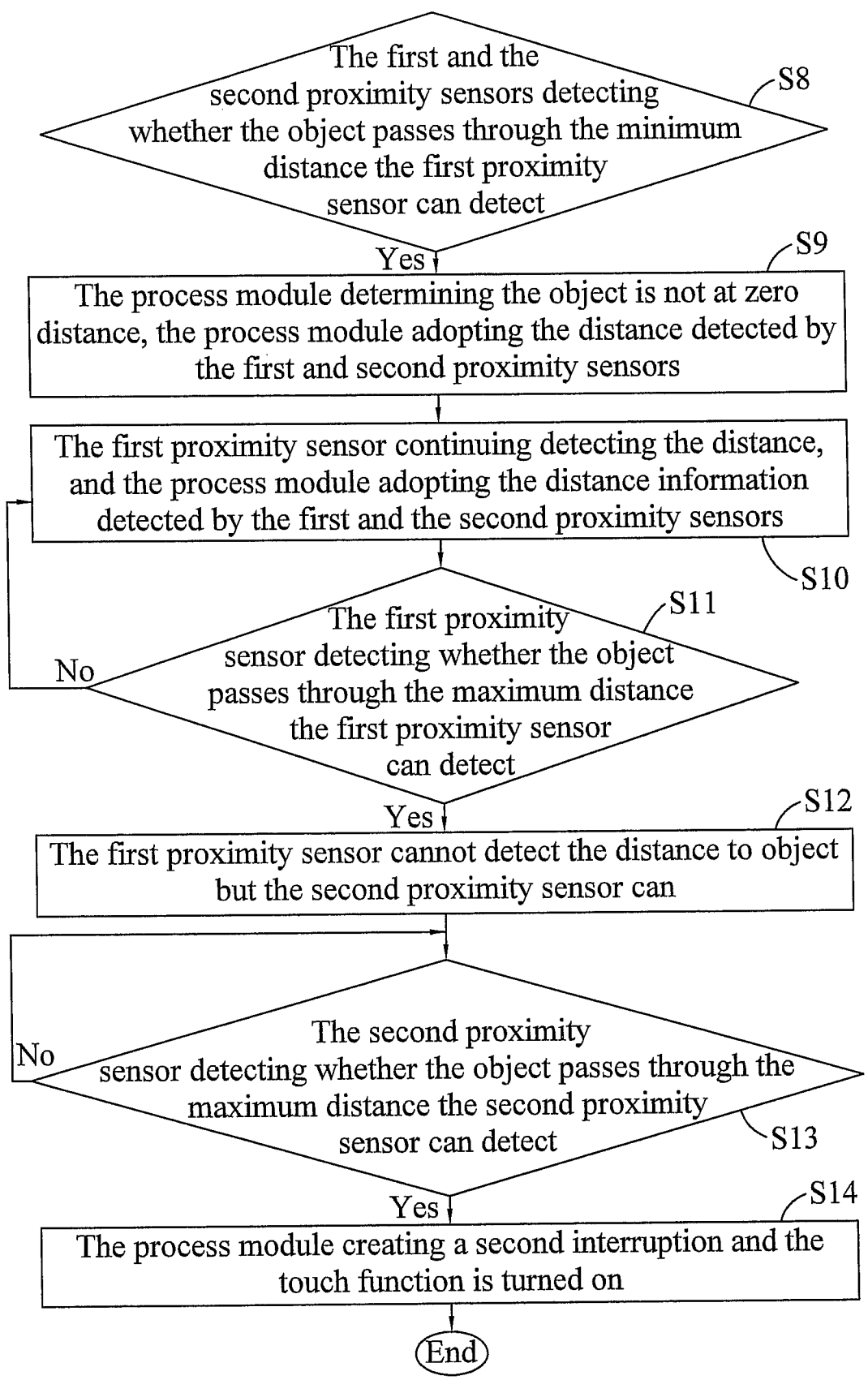
FIG. 7 is a partial flowchart illustrating sensing method of sensor apparatus with different proximity sensors detecting object from zero distance to far distance to the first embodiment according to the present invention.

Therefore, the first embodiment provides a method of the sensor apparatus with two proximity sensors with different sensitivities. Please note that the number of the proximity sensors in the first embodiment is only for example, and it can be a plurality of proximity sensors depending on the situation. Please refer to FIG. 6 and FIG. 7. FIG. 6 is a partial flowchart illustrating sensing method of sensor apparatus with different proximity sensors detecting object from far distance to zero distance of the first embodiment according to the present invention; FIG. 7 is a partial flowchart illustrating sensing method of sensor apparatus with different proximity sensors detecting object from zero distance to far distance of the first embodiment according to the present invention. The method of the sensor apparatus with two proximity sensors with different sensitivities comprises the following steps:

In step S1, the second proximity sensor detecting whether the object passes through the maximum distance the second proximity sensor can detect;

In step S2, the second proximity sensor continuing detecting the distance, and touch function keeping working, presetting when the first proximity sensor cannot detect the distance to the object but the second proximity sensor can, the process module adopts the distance information detected by the second proximity sensor;

In step S3, the first proximity sensor detecting whether the object passes through the maximum distance the first proximity sensor can detect;

In step S4, the process module creating a first interruption and the touch function is turned off;

In step S5, the first proximity sensor continuing detecting the distance, and the process module adopting the distance information detected by the first and the second proximity sensors;

In step S6, the first and the second proximity sensors detecting whether the object passes through the minimum distance the first proximity sensor can detect;

In step S7, the process module determining the object is at zero distance, the process module adopting the distance detected by the second proximity sensor;

In step S8, the first and the second proximity sensors detecting whether the object passes through the minimum distance the first proximity sensor can detect;

In step S9, the process module determining the object is not at zero distance, the process module adopting the distance detected by the first and second proximity sensors;

In step S10, the first proximity sensor continuing detecting the distance, and the process module adopting the distance information detected by the first and the second proximity sensors;

In step S11, the first proximity sensor detecting whether the object passes through the maximum distance the first proximity sensor can detect;

In step S12, the first proximity sensor cannot detect the distance to object but the second proximity sensor can; and In step S13, the second proximity sensor detecting whether the object passes through the maximum distance the second proximity sensor can detect.

In step S14, the process module creating a second interruption and the touch function is turned on.

In practical usage, the distance detected by the proximity sensors is not only influenced by the sensitivity of the proximity sensors. Other critical factors such as the arrangement of those proximity sensors, the locations of the transparent areas, and the location of the emitting device also determine the distance the proximity sensors are able to detect. Therefore, the first proximity sensor may detect the coming object farther than the second proximity sensor in some condition.

Figure 8:
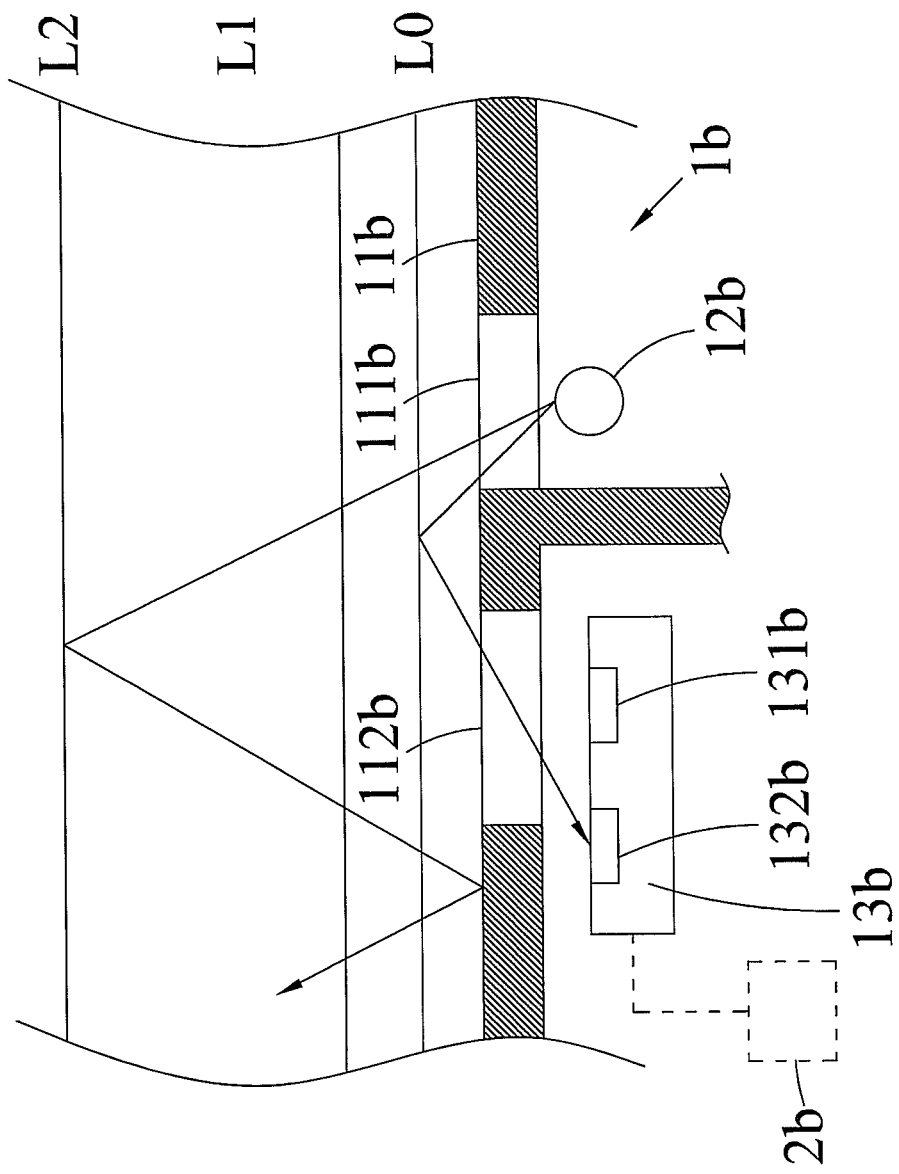
FIG. 8 is a perspective side view illustrating two different proximity sensors of the sensor apparatus of the second embodiment according to the present invention.
Figure 9:
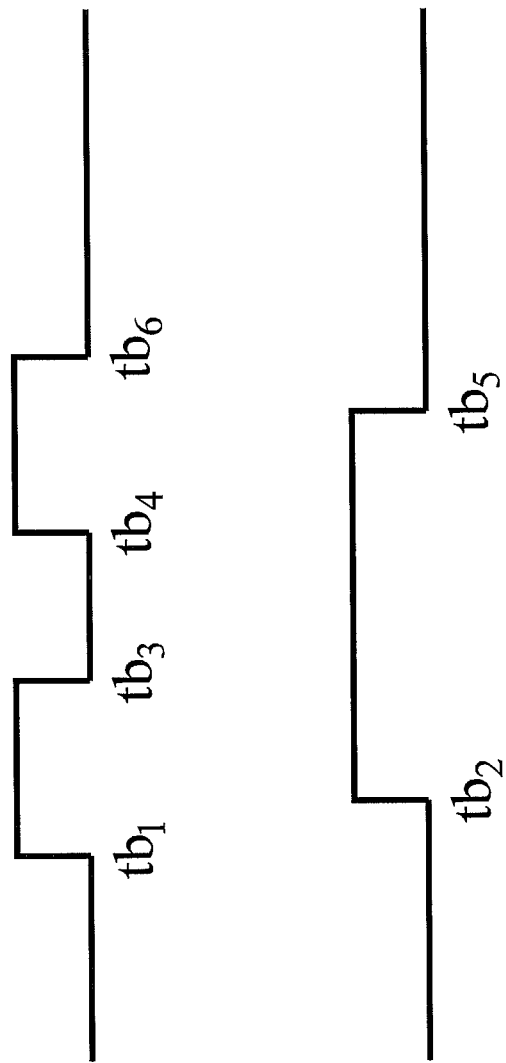
FIG. 9 is a timing diagram of two proximity sensors of the second embodiment according to the present invention.

Please refer to FIG. 8 and FIG. 9. FIG. 8 is a perspective side view illustrating two different proximity sensors of the sensor apparatus of the second embodiment according to the present invention. FIG. 9 is a timing diagram of two proximity sensors of the second embodiment according to the present invention.

In the FIG. 8, a sensor apparatus 1$b$ comprises a panel 11$b$, an emitting device 12$b$, and a proximity sensor module 13$b$. The panel 11$b$ includes a first transparent area 111$b$ and a second transparent area 112$b$. The panel 11$b$ includes a plurality of sensors (not shown) which help to provide touch function.

The proximity sensor module 13$b$ includes a first proximity sensor 131$b$ and a second proximity sensor 132$b$. The first proximity sensor 131$b$ is a kind of low sensitivity proximity sensor. The second proximity sensor 132$b$ is a kind of high sensitivity proximity sensor. The first proximity sensor 131$b$ which is a proximity sensor with low sensitivity hard to detect the zero distance L0. In FIG. 8, the maximum distance the first proximity sensor 131$b$ can measure the object is L1; the minimum distance the first proximity sensor 111$b$ can measure the object is zero distance L0. The maximum distance the second proximity sensor 132$b$ can measure is L2. However, the actual distance detected by the second proximity sensor 132$b$ is smaller than L2; the second proximity sensor 132$a$ is still able to detect the object even though the object passes through the zero distance L0. The reason that actual distance detected by the second proximity sensor 132$b$ is smaller than L2 or even smaller than L1 in the second embodiment is the location of the second proximity sensor 132$b$ on the proximity module 13$b$ and the shape of the second transparent area 112$b$. The second transparent area 112$b$ is disposed above the proximity sensor module 13$b$ but in the second embodiment it is only large enough for light reflected from the object to pass though and thus reach the first proximity sensor 131$b$. The second proximity sensor 132$b$ can only get the light reflected from the object (not shown) through the second transparent area 112$b$ only when distance to the object is closer than L1, or the light reflected from the object will be reflected again by the panel.

The upper wave represents the process module 2$b$ receiving the information from the first proximity sensor 131$b$. The bottom wave represents the process module 2$b$ receiving the information from the second proximity sensor 132$b$. The points $tb_1$, $tb_2$, $tb_3$, $tb_4$, $tb_5$ merely represent the order. The FIG. 9 describes the circumstance and reaction that the object from far to zero distance, and then from zero distance to far distance of the present invention.

Point $tb_1$: the object passes through the L1 (the maximum distance the first proximity sensor 131$b$ can measure). Because of the second proximity sensor 132$b$ cannot detect the light until the reflection from certain angle, the wave crest of the first proximity sensor 131$b$ is earlier than the wave crest of the second proximity sensor 132$b$, which happens at $tb_2$ in this embodiment. The process module 2$b$ creates a first interruption (not shown) when the wave of the first proximity sensor 131$b$ suddenly change from wave trough to wave crest at point $tb_1$, and the touch function is turned off.

Point $tb_2$: the second proximity sensor 132$b$ detects the light. The bottom wave at wave crest immediately.

Point $tb_3$: the object passes through zero distance L0 (the minimum distance the first proximity sensor 131$b$ can measure, and it could be close to or attach to the present invention). The first proximity sensor 131$b$ cannot detect the object and therefore the upper wave of FIG. 9 changes from wave crest to wave trough. On the contrary, the second proximity sensor 132$b$ is still at wave crest. The process module 2$b$ adopts the distance information detected by the second proximity sensor 132$b$.

Point $tb_4$: the object passes through zero distance L0 (the object is leaving the present invention). The first proximity sensor 131$b$ can detect the object and therefore the upper wave and the middle wave are both at wave crest again.

Point $tb_5$: the object passes through the limit distance that the second proximity sensor 132$b$ cannot actually detect the object. The bottom wave is at wave trough and the upper wave is at wave crest.

Point $tb_6$: the object passes through the L1. The upper wave is at wave trough. The first proximity sensor 131$b$ cannot detect the object. The process module 2$b$ creates a second interruption (not shown) when the wave of the first proximity sensor 131$b$ suddenly change from wave trough to wave crest at point $tb_6$, and the touch function is turned on.

The first embodiment and the second embodiment prove that the time the high sensitivity proximity sensor and low sensitivity proximity sensor receive the light reflected from the object can be influenced by many factors. However, the combining the high sensitivity proximity sensor and low sensitivity proximity sensor, especially the changes in wave crest and wave trough of one proximity sensor interacting with another to help the process module to determine when to turn on or turn off the touch function. For example, when both of the first proximity sensor and the second proximity sensor detect the distance to the object, the process module creates a first interruption which causes the touch function turn off. Creating the first interruption is necessarily happened before the object passes through zero distance L0. Creating interruptions is one of the methods to help the process module to determine, but it should not limit the scope of the present invention.

Figure 10:
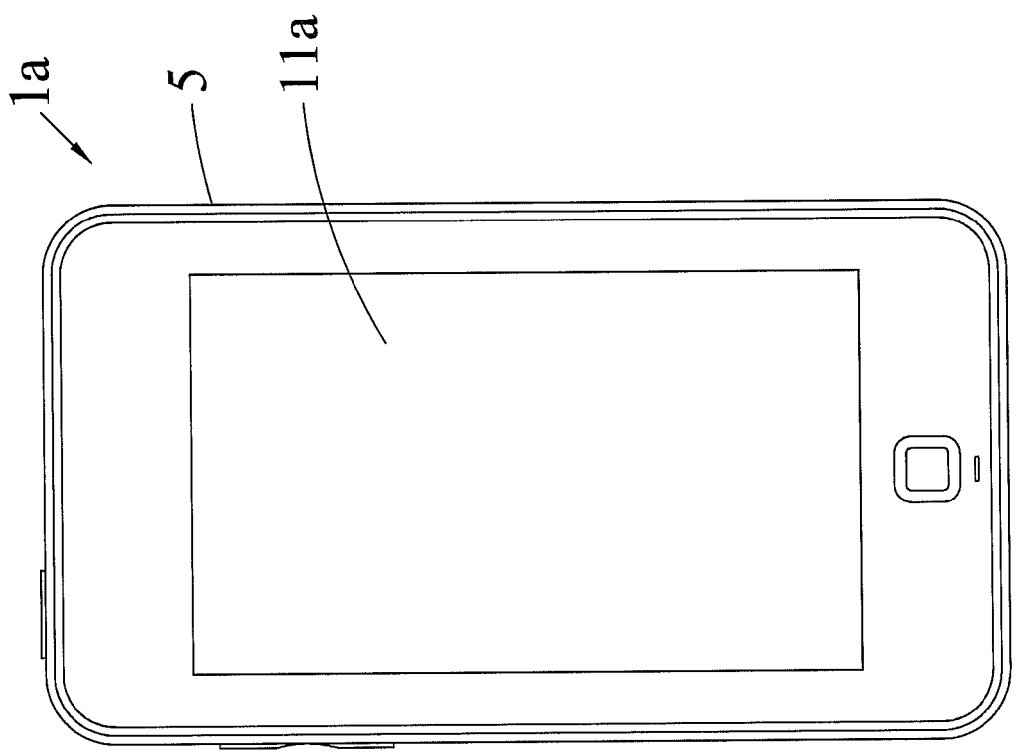
FIG. 10 is a schematic view illustrating sensor apparatus with different sensors of the present invention combining with a handheld devise.

Please refer to FIG. 10, which is a schematic view illustrating sensor apparatus with different sensors of the present invention combining with a handheld devise. At least one proximity module is set on the panel 11$a$ of a handheld device 1$a$.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A sensor apparatus, comprising:
a panel including a first transparent area and a second transparent area;
an emitting device located under the panel and the emitting device emitting a light passing through the first transparent area; and
a proximity sensor module located under the panel and the proximity sensor module including at least one proximity sensor which is a second proximity sensor and at least one proximity sensor which is a first proximity sensor, wherein a sensitivity of the second proximity sensor is higher than that of the first proximity sensor, and the proximity sensor module receiving the light passing through the second transparent area,
wherein the light passing through the first transparent area and then reflecting from an object to passing through the second transparent area, and the panel is able to provide a touch function, wherein a maximum distance the second proximity sensor can measure the object is farther than that of the first proximity sensor, and a minimum distance the second proximity sensor can measure the object is nearer than that of the first proximity sensor; the minimum distance the first proximity sensor can measure the object is zero distance L0, the second proximity sensor is still able to detect the object even though the object passes through the zero distance L0; wherein the touch function can be turned on or turned off depending on whether the first proximity sensor and the second proximity sensor detect the object.

2. The sensor apparatus as claimed in claim 1, wherein the sensor apparatus connects with a process module in order to get information from the proximity sensor module.

3. The sensor apparatus as claimed in claim 2, wherein the first proximity sensor and the second proximity sensor detect a distance to the object and transmit information to a process module to determine when to turn off the touch function.

4. The sensor apparatus as claimed in claim 3, wherein the first proximity sensor is unable to detect the object when the object is at a zero distance and the second proximity sensor detects the object when the object is at the zero distance.

5. The sensor apparatus as claimed in claim 4, wherein the process module creates a first interruption when both of the first proximity sensor and the second proximity sensor detect the distance to the object.

6. The sensor apparatus as claimed in claim 5, wherein creating the first interruption is happened before the object passes through zero distance.

7. The sensor apparatus as claimed in claim 2, wherein the second proximity sensor is partially under the second transparent area.

8. The sensor apparatus as claimed in claim 2, wherein the touch function is turned on when the first proximity sensor and the second proximity sensor are not able to detect a distance to the object and transmit information to a process module.

9. A method of the sensor apparatus with at least two proximity sensors with different sensitivities comprises the following steps:
providing a panel including a first transparent area and a second transparent area;
providing an emitting device located under the panel and the emitting device emitting a light passing through the first transparent area; and
providing a proximity sensor module located under the panel and the proximity sensor module including at least one proximity sensor which is a second proximity sensor and at least one proximity sensor which is a first proximity sensor, wherein a sensitivity of the second proximity sensor is higher than that of the first proximity sensor, and the proximity sensor module receiving the light passing through the second transparent area,
wherein the light passing through the first transparent area and then reflecting from a object to passing through the second transparent area, and the panel is able to provide a touch function,
wherein a maximum distance the second proximity sensor can measure the object is farther than that of the first proximity sensor, and a minimum distance the second proximity sensor can measure the object is nearer than that of the first proximity sensor; the minimum distance the first proximity sensor can measure the object is zero distance L0, the second proximity sensor is still able to detect the object even though the object passes through the zero distance L0; wherein the touch function can be turned on or turned off depending on whether the first proximity sensor and the second proximity sensor detect the object.

10. The method of the sensor apparatus with at least two proximity sensors with different sensitivities as claimed in claim 9, further comprising the following step:
detecting whether the object passes through a maximum distance the first proximity sensor and the second proximity sensor are able to detect.

11. The method of the sensor apparatus with at least two proximity sensors with different sensitivities as claimed in claim 10, further comprising the following steps: creating a first interruption and turning off the touch function when the object detecting by both of the first proximity sensor and the second proximity sensor.

12. The method of the sensor apparatus with at least two proximity sensors with different sensitivities as claimed in claim 11, further comprising the following step: continuing detecting the distance by the first proximity sensor, and adopting a distance information detected by the first proximity sensor and the second proximity sensor by the process module.

13. The method of the sensor apparatus with at least two proximity sensors with different sensitivities as claimed in claim 12, further comprising the following step: detecting whether the object passes through the minimum distance the first proximity sensor is able to detect by the first proximity sensor.

14. The method of the sensor apparatus with at least two proximity sensors with different sensitivities as claimed in claim 13, further comprising the following step: determining the object at a zero distance by the first proximity sensor, adopting a distance detected by the second proximity sensor by the process module.

15. The method of the sensor apparatus with at least two proximity sensors with different sensitivities as claimed in claim 14, further comprising the following step: detecting whether the object passes through a minimum distance the first proximity sensor is able to detect by the first proximity sensor and the second proximity sensor.

16. The method of the sensor apparatus with at least two proximity sensors with different sensitivities as claimed in claim 15, wherein determining the object is not at zero distance by the process module, adopting the distance detected by the first proximity sensor and the second proximity sensor by the process module.

17. The method of the sensor apparatus with at least two proximity sensors with different sensitivities as claimed in claim 16, further comprising the following step: continuing detecting the distance by the first proximity sensor, and adopting the distance information detected by the first proximity sensor and the second proximity sensor by the process module.

18. The method of the sensor apparatus with at least two proximity sensors with different sensitivities as claimed in claim 17, further comprising the following step: detecting whether the object passes through the maximum distance the first proximity sensor is able to detect by the first proximity sensor.

19. The method of the sensor apparatus with at least two proximity sensors with different sensitivities as claimed in claim 18, further comprising the following step: creating a second interruption and turning on the touch function when the object being not detected by the first proximity sensor and the second proximity sensor.

* * * * *